United States Patent
Rajagopalan et al.

(10) Patent No.: US 7,417,106 B2
(45) Date of Patent: Aug. 26, 2008

(54) COMPOSITIONS FOR USE IN GOLF BALLS

(75) Inventors: Murali Rajagopalan, South Dartmouth, MA (US); Shenshen Wu, North Dartmouth, MA (US); Manjari Kuntimaddi, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 229 days.

(21) Appl. No.: 11/162,544

(22) Filed: Sep. 14, 2005

(65) Prior Publication Data

US 2006/0014923 A1  Jan. 19, 2006

Related U.S. Application Data

(63) Continuation-in-part of application No. 10/859,557, filed on Jun. 2, 2004, now Pat. No. 7,105,628.

(51) Int. Cl.
A63B 37/12 (2006.01)
A63B 37/00 (2006.01)
C08G 18/10 (2006.01)

(52) U.S. Cl. .............. 528/61; 528/64; 528/65; 473/374; 473/378

(58) Field of Classification Search .......... None
See application file for complete search history.

(56) References Cited

U.S. PATENT DOCUMENTS

| | | | | |
|---|---|---|---|---|
| 4,007,239 A * | 2/1977 | Blahak et al. | ............ | 558/251 |
| 4,365,051 A * | 12/1982 | Chung et al. | ............ | 528/64 |
| 5,334,673 A | 8/1994 | Wu | | |
| 5,484,870 A | 1/1996 | Wu | | |
| 5,692,974 A | 12/1997 | Wu et al. | | |
| 5,733,428 A | 3/1998 | Calabria et al. | | |
| 5,888,437 A | 3/1999 | Calabria et al. | | |
| 5,908,358 A | 6/1999 | Wu | | |
| 5,947,843 A | 9/1999 | Calabria et al. | | |
| 6,042,768 A | 3/2000 | Calabria et al. | | |
| 6,193,619 B1 | 2/2001 | Wu et al. | | |
| 6,371,870 B1 | 4/2002 | Calabria et al. | | |
| 6,486,261 B1 * | 11/2002 | Wu et al. | ............ | 525/332.6 |
| 6,610,812 B1 | 8/2003 | Wu et al. | | |
| 6,818,705 B2 | 11/2004 | Wu et al. | | |
| 2003/0212291 A1 * | 11/2003 | Gajewski et al. | ............ | 560/19 |

FOREIGN PATENT DOCUMENTS

JP  2003-342347  12/2003

OTHER PUBLICATIONS

Thain, Science of Golf IV, Jul. 2002; p. 319-327.*

* cited by examiner

*Primary Examiner*—David Buttner
(74) *Attorney, Agent, or Firm*—Mandi B. Milbank

(57) ABSTRACT

A golf ball having a core and at least one layer disposed about the core is disclosed. The at least one layer is formed from a composition having multiple reactive and/or non-reactive ingredients. At least one of these ingredients is a sterically hindered polyamine, preferably formed from an active hydrogen functional compound and an amine/acid ortho- or meta-substituted cyclic compound.

18 Claims, No Drawings

COMPOSITIONS FOR USE IN GOLF BALLS

CROSS-REFERENCE TO RELATED APPLICATIONS

This application is a continuation-in-part of U.S. application Ser. No. 10/859,557, filed Jun. 2, 2004, now U.S. Pat. No. 7,105,628, the disclosure of which is incorporated herein by reference in its entirety.

FIELD AND BACKGROUND

The present disclosure is directed to compositions for use in golf ball that has superior resistance to water and moisture vapor in comparison to conventional materials, and golf balls formed from such compositions. One conventional material used to form golf ball covers is balata, a natural or synthetic trans-polyisoprene rubber. The softness of the balata cover allows the player to achieve spin rates sufficient to more precisely control ball direction and distance, particularly on shorter shots. However, balata covers lack the durability required by the average golfer, and are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Polyurethanes and polyureas, by providing soft "feel," have also been recognized as useful materials for golf ball covers. However, commercially available polyurea compositions typically have high melting temperatures and fast reaction rates, making them difficult to process. They also tend to form hard elastomers.

Therefore, a continuing need remains for novel material compositions usable in forming golf ball portions (e.g., covers) having desirable and/or optimal combination of physical and performance characteristics. Compositions comprising sterically hindered polyamines, such as those disclosed herein, may be suitable for forming one or more portions of the golf ball.

SUMMARY

This disclosure is directed to a golf ball having a core and at least one layer (e.g., cover layer) disposed about the core. Optionally, the golf ball further comprises an outer cover layer disposed about the at least one layer, or an intermediate layer disposed between the core and the at least one layer. The core may have a diameter of 1 inch or greater. The at least one layer may have a thickness of 0.005 inches to 0.1 inches. The core may be a solid core having a compression of 40 to 100 and/or a coefficient of restitution of 0.7 or greater. The at least one layer may have a flexural modulus of 1,000 psi to 100,000 psi or a Shore D hardness of 90 or less. The golf ball may have a coefficient of restitution of 0.7 or greater.

The at least one layer may be formed from a composition comprising a sterically hindered polyamine. In one example, the composition may further comprise a polyisocyanate reactive to the sterically hindered polyamine to form an isocyanate-containing prepolymer. In another example, the composition may further comprise an isocyanate-containing prepolymer formed from a telechelic polyahl and a polyisocyanate, and the prepolymer is reactive to the sterically hindered polyamine. The sterically hindered polyamine may have one of the following structures, where —$(R_8)_x$NHR$_2$ and —$(R_7)_y$CO— are ortho- or meta-substituents on the cyclic rings; A is the same or different moieties chosen from O, S, and NR; R is hydrogen or organic moieties having 1 to 20 carbon atoms; $R_1$ is a divalent or polyvalent organic moieties having at least one carbon or silicon atom; $R_2$ is hydrogen or organic moieties having 1 to 20 carbon atoms; $R_3$ to $R_6$ are independently chosen from hydrogen, halides, nitro, and organic moieties having 1 to 20 carbon atoms; $R_7$ is an organic moiety having at least one C, O, N, S, or Si atom; $R_8$ is a divalent organic moiety having one carbon atom connecting —NHR$_2$ to the cyclic ring; m is greater than 1; and x, y, and z are independently 0 or 1.

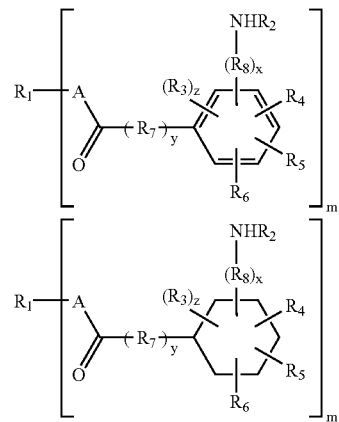

The sterically hindered polyamine may be formed from a first compound being an active hydrogen functional compound, and a second compound chosen from cyclic compounds having ortho- or meta-positioned (organo)amine and (organo)acid substitutions, esters thereof, and substituted or unsubstituted oxazine diones. The active hydrogen functional compound may be chosen from alkanediols, alkanetriols, polyalkanediols, dihydroxy telechelics, and trihydroxy telechelics. Non-limiting examples include ethylene glycol, 1-phenyl-1,2-ethanediol, 1,2-propanediol, 1,3-propanediol, 2-methyl-1,3-propanediol, 1,3-butanediol, 1,4-butanediol, 2,3-butanediol, 2-methyl-1,4-butanediol, 1,1,4,4-tetraphenyl-1,4-butanediol, 2,2,4,4-tetramethyl-1,3-cyclobutanediol, 1,5-pentanediol, 2,4-pentanediol, 2-methyl-2,4-pentanediol, 1,6-hexanediol, 2,5-hexanediol, 1,7-heptanediol, 1,8-octanediol, 1,12-dodecanediol, 2-n-butyl-2-ethyl-1,3-propanediol, 3-chloro- 1,2-proanediol, 1,4-cyclohexanediol, 2,5-dimethyl-2,5-hexanediol, 2,2-dimethyl-1,3-propanediol, 2,2-diphenyl-1,3-propanediol, 2-ethyl-1,3-hexanediol, 2-ethyl-2-methyl-1,3-propanediol, hydroquinone di(β-hydroxyethyl)ether, hydroquinone di(β-hydroxypropyl)ether, resorcinol di(β-hydroxyethyl)ether, resorcinol di(β-hydroxypropyl)ether, and 2,2-bis(4-hydroxyphenol)propane.

In one example, the second compound may have one of the following structures, where —$(R_8)_x$NHR$_2$ and —$(R_7)_y$CO— are ortho- or meta-substituents on the cyclic rings; $R_2$ is hydrogen or organic moieties having 1 to 20 carbon atoms; $R_3$ to $R_6$ are independently chosen from hydrogen, halides, nitro, and organic moieties having 1 to 20 carbon atoms; $R_7$ is an organic moiety having at least one C, O, N, S, or Si atom; $R_8$ is a divalent organic moiety having one carbon atom connecting —NHR$_2$ to the cyclic ring; R$_9$ is chosen from hydrogen and organic moieties having 1 to 20 carbon atoms, optionally further having one or more heteroatoms; and x, y, and z are independently 0 or 1.

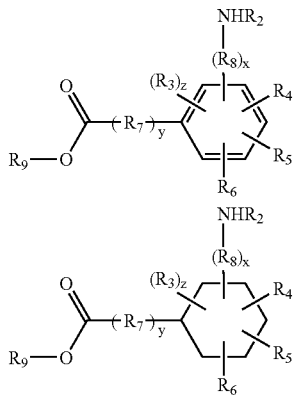

In another example, the second compound may have one of the following structures, where R is chosen from hydrogen and organic moieties having 1 to 20 carbon atoms; Z$_1$ to Z$_4$ are independently chosen from hydrogen, halides, nitro groups, and organic moieties having 1 to 20 carbon atoms, each optionally having one or more heteroatoms.

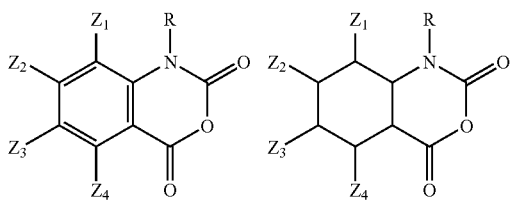

DETAILED DESCRIPTION

Broadly, the present disclosure is directed to golf balls comprising compositions formed at least in part from one or more sterically hindered polyamines.

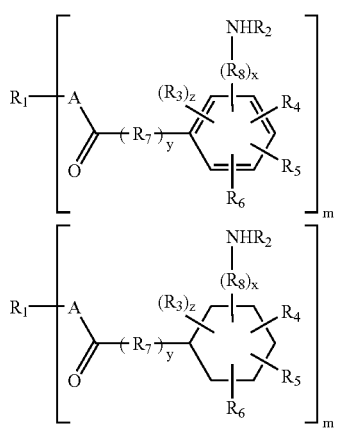

Non-limiting structures of suitable sterically hindered polyamines include those illustrated above, where —(R$_8$)$_x$ NHR$_2$ and —(R$_7$)$_y$CO— are ortho- or meta-substituents on the cyclic rings; A is the same or different moieties chosen from O, S, and NR, R being hydrogen, organic moieties having at least one carbon atom, preferably 20 or less carbon atoms, more preferably 12 or less carbon atoms; R$_1$ is a divalent or polyvalent organic moieties having at least one carbon or silicon atom, such as 1,000 carbon or silicon atoms or less; R$_2$ is hydrogen, organic moieties having at least one carbon atom, preferably 20 or less carbon atoms, more preferably 6 or less carbon atoms; R$_3$ to R$_6$ are independently chosen from hydrogen, halides, nitro, organic moieties having at least one carbon atom, preferably 20 or less carbon atoms, more preferably 6 or less carbon atoms; R$_7$ is an organic moiety having at least one C, O, N, S, or Si atom, such as a divalent, linear or branched organic moiety having 60 carbon atoms or less, preferably 20 carbon atoms or less; R$_8$ is a divalent organic moiety having one carbon atom connecting —NHR$_2$ to the cyclic ring, such as —CH$_2$—, —CH(CH$_3$)—, —CH(CH$_2$CH$_3$)—, or —C(CH$_3$)$_2$—; m is 1 or greater, preferably 2 to 10, like 3, 4, 6, 8, and ranges between any two of such numbers; x, y, and z are independently 0 or 1. One or more of R and R$_1$ to R$_6$ can have one or more heteroatoms chosen from O, N, S, and Si.

Certain sterically hindered polyamines described above can be obtained by reacting one or more cyclic (aromatic or alicyclic) compounds having ortho- or meta-positioned (or-gano)amine and (organo)acid substitutions and esters thereof, such as (organo)amino(organo)benzene(organo)acids (including aminobenzoic acids, aminobenzene organoacids, amino-organobenzoic acids, organo-aminobenzoic acids, amino-organobenzene organoacids, organo-aminobenzene organoacids, organo-amino-organobenzoic acids, and organo-amino-organobenzene organoacids), (organo)amino (organo)cyclohexane (organo)acids (including aminocyclohexane acids, aminocyclohexane organoacids, amino-orga-nocyclohexane acids, organo-aminocyclohexane acids, amino-organocyclohexane organoacids, organo-aminocyclohexane organoacids, organo-amino-organocyclohexane acids, and organo-amino-organocyclohexane organoacids), and their respective esters (such as methyl esters, ethyl esters, propyl esters, isopropyl esters, butyl esters, isobutyl esters, t-butyl esters, pentyl esters, hexyl esters, and other linear and branched alkyl esters known to one skilled in the art), with one or more compounds having two or more active hydrogen functionalities (e.g., the various amine- and/or hydroxy-functional compounds and telechelics disclosed herein). Non-limiting examples of active hydrogen functional compounds include those having a structure of R$_1$[AH]$_m$, where A, and m are as described above, R$_1$ can be linear or branched, divalent or higher polyvalent (e.g., trivalent, tetravalent), substituted (such as halogenated) or unsubstituted, monomeric, oligomeric, or polymeric, aliphatic, cyclic, alicyclic, aromatic, or araliphatic, include organic moieties having at least one carbon atom, preferably 350 or less carbon atoms, more preferably 60 or less carbon atoms, further preferably 20 or less carbon atoms, further preferably 12 or less carbon atoms, further preferably polymeric or alkylene moieties (e.g., methylene, ethylene, propylene, butylene, pentylene, hexylene, heptylene, octylene, nonylene, decylene, undecylene, dodecylene), and isomers thereof. Suitable active hydrogen functional compounds can be chosen diols, polyols, diamines, polyamines, and telechelic polyahis disclosed herein and in the parent application, including alkanediols, alkanetriols, polyalkanediols, dihydroxy telechelics, trihydroxy telechelics, alkanediamines, alkanetriamines, polyamine telechelics, aminoalcohols, telechelic aminoalcohols, and isomers thereof. Non-limiting examples of preferred diols include ethylene glycol, 1-phenyl-1,2-ethanediol, 1,2-propanediol, 1,3-propanediol, 2-methyl-1,3-propanediol, 1,3-butanediol, 1,4-butanediol, 2,3-butanediol, 2-methyl-1,4-butanediol, 1,1,4,4-tetraphenyl-1,4-butanediol, 2,2,4,4-tetramethyl-1,3-cyclobutanediol, 1,5-pentanediol, 2,4-pentanediol, 2-methyl-2,4-pentanediol, 1,6-hexanediol, 2,5-hexanediol, 1,7-heptanediol, 1,8-octanediol, 1,12-dodecanediol, 2-n-butyl-2-ethyl-1,3-propanediol, 3-chloro-1,2-proanediol, 1,4-cyclohexanediol, 2,5-dimethyl-2,5-hexanediol, 2,2-dimethyl-1,3-propanediol, 2,2-diphenyl-1,3-propanediol, 2-ethyl-1,3-hexanediol, 2-ethyl-2-methyl-1,3-propanediol, hydroquinone di(β-hydroxyethyl)ether, hydroquinone di(β-hydroxypropyl)ether, resorcinol di(β-hydroxyethyl)ether, resorcinol di(β-hydroxypropyl)ether, 2,2-bis(4-hydroxyphenol)propane.

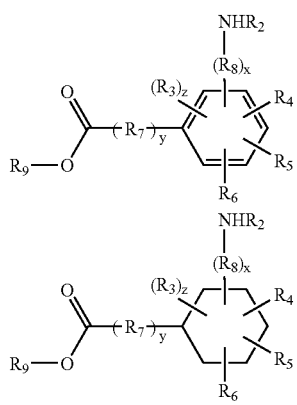

Non-limiting examples of amine/acid ortho- or meta-substituted cyclic compounds and esters thereof may have one of the above structures, where $R_2$ to $R_8$, x, y, and z are as described above, and $R_9$ is chosen from hydrogen, organic moieties having at least one carbon atom, preferably 20 or less carbon atoms, more preferably 12 or less carbon atoms, and may have one or more heteroatoms chosen from O, N, S, and Si. $R_9$ can be linear or branched, substituted (e.g., halogenated) or unsubstituted, aliphatic, cyclic, alicyclic, aromatic, or araliphatic, include alkyl moieties (e.g., methyl, ethyl, propyl, isopropyl, butyl, sec-butyl, tert-butyl, pentyl, hexyl, cyclohexyl, heptyl, octyl, nonyl, decyl, undecyl, dodecyl), and isomers thereof. Non-limiting examples of suitable amine/acid ortho- or meta-substituted aromatic compounds and esters thereof include 2-aminobenzoic acid, 2-amino-(3, 4, 5, or 6)-methylbenzoic acid, 5-nitro anthranilic acid, 2-amino-(3 or 5)-hydroxybenzoic acid, 2-amino-(3, 4, 5, or 6)-chlorobenzoic acid, 2-amino-6-bromo-5-methylbenzoic acid, 2-amino-phenylacetic acid, 2-amino-3-benzoylphenylacetic acid, 2-amino-3-(4-bromobenzoyl)phenylacetic acid, 3-aminobenzoic acid, 3-amino-4-methylbenzoic acid, 3-amino-4-methoxybenzoic acid, 3-amino-(2, 4, or 6)-chlorobenzoic acid, 3-amino-phenylacetic acid, methyl-2-aminobenzoate, methyl-2-amino-5-bromobenzoate, methyl-2-amino-3,5-dibromobenzoate, ethyl-2-aminobenzoate, pentyl-2-aminobenzoate, 2-propenyl-2-aminobenzoate, cyclohexyl-2-aminobenzoate, methyl-2-methylaminobenzoate, methyl-2-methylaminobenzoate, sec-butyl-2-methylaminobenzoate, methyl-3-aminobenzoate, methyl-3-amino-4-methylbenzoate, methyl-3-amino-4-methoxybenzoate, ethyl-3-aminobenzoate, isomers thereof, and mixtures of two or more thereof. Illustrative examples of cyclohexane analogs to the aminobenzoic acids include, but are not limited to, 2-aminomethyl-cyclohexane carboxylic acid, 3-aminomethyl-cycicohexane carboxylic acid, isomers thereof, and mixtures of two or more thereof. Blends of one or more ortho- or meta-(organo)amino aromatic acids and one or more ortho- or meta-(organo)amino alicyclic acids may be used to form the sterically hindered polyamines.

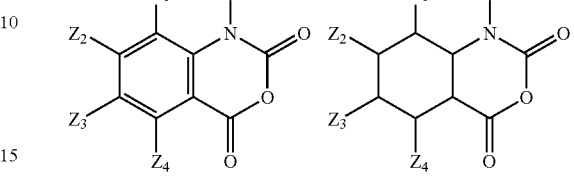

Alternatively, the sterically hindered polyamines may be obtained by reacting the active hydrogen functional compounds or telechelic polyahis with substituted or unsubstituted oxazine diones (e.g., anhydrides). Non-limiting examples of suitable oxazine diones include benzoxazine diones and cyclohexane oxazine diones having the above-shown generic structures, where R is chosen from hydrogen, organic moieties having at least one carbon atom, preferably 20 or less carbon atoms, more preferably 6 or less carbon atoms; $Z_1$ to $Z_4$ are independently chosen from hydrogen, halides, nitro groups, organic moieties having at least one carbon atom, preferably 20 or less carbon atoms, more preferably 6 or less carbon atoms. One or more of R and $Z_1$ to $Z_4$ may contain one or more heteroatoms such as O, N, S, or Si, and/or may be partially or fully halogenated. Non-limiting examples include isatoic anhydride, N-methyl isatoic anhydride, 5-nitro-isatoic anhydride, 3-methyl-benzoxazine-2,4-dione, 3-phenyl-1,3-benzoxazine-2,4-dione, 3-(4-methylphenyl)-1,3-benzoxazine-2,4-dione, 1-[3-(perfluorooctyl)propyl]-(1H-benzo[d][1,3]oxazine-2,4-dione (F-isatoic anhydride available from Fluorous Technologies, Inc. of Pittsburgh, Pa.), isomers thereof, and mixtures of two or more thereof.

Other sterically hindered polyamines suitable for use in golf balls and compositions of the present disclosure further include those formed by applying the various reaction themes described above to other cyclic analogs where the benzene or cyclohexane rings of the above-mentioned reactants and reaction products are replaced by other saturated or unsaturated 4-membered or larger (e.g., 5-membered, 7-membered, 8-membered, 10-membered) cyclic structures, including monocyclics, polycyclics (fused, spiro, and/or bridged), and heterocyclics (i.e, having one or more heteroatoms like N, O, S, Si in the ring structure), such as cyclopentane. In the case of saturated cyclic structures, the at least one amine-containing substitution and the at least one acid/ester-containing substitution may be directly attached to the same ring-member carbon atom, as in the case of 1-aminocyclopentane carboxylic acid.

The compositions that incorporate one or more of the above-described sterically hindered polyamines may form thermoplastic, thermoset, castable, millable, or foamable (intumescent or swellable) materials. Preferably, the materials are elastomers having urethane and/or urea linkages (e.g., polyurethanes, polyureas, poly(urethane-urea)s). In forming the compositions of the present disclosure, the sterically hindered polyamines may be used as a non-reactive component. That is, the composition is substantially free of ingredients that are capable of reacting with the sterically hindered polyamines, such as isocyanates. Alternatively, the sterically hindered polyamines may be used in a reactive, preferably liquid, composition where the sterically hindered polyamines react with one or more other ingredients by forming organic linkages (e.g., urea, amide). In one example, the reactive composition comprises one, or a blend of two or more, of the sterically hindered polyamines, an isocyanate or a blend of two or more isocyanates, and optionally a curative (e.g., polyahis). The sterically hindered polyamines may form one or more hard segments of the resulting material (e.g., polyurethanes, polyureas) when the isocyanate is an isocyanate-containing prepolymer formed from a polyisocyanate and a polyahl, preferably a telechelic polyahl as described herein and in the parent application. Alternatively, the sterically hindered polyamines may form one or more soft segments of the resulting material by reacting with a polyisocyanate to form an isocyanate-containing prepolymer. Isocyanate-containing prepolymers may have a % NCO of 15% or less (e.g., 10.9% to 12.1%), preferably 10% or less (e.g., 8% to 9.7%, 6% to 9%), more preferably 7.5% or less (e.g., 4% to 5%), but not less than 2% (e.g., 2.1% to 3.2%, 2.7% to 4.2%). Combination of low % NCO and low isocyanate functionality in the prepolymer (e.g., 2.5 or less) may render the prepolymer difficult to process. In such situations, plasticizers like soybean oil, dioctylphthalate, and other phthalates may be blended with the prepolymer to reduce viscosity.

The sterically hindered polyamines may be used singly or in blends of two or more thereof when forming the isocyanate-containing prepolymer. Preferably, one or more of the sterically hindered polyamines may be blended with one or more telechelic polyahis (e.g., polyhydrocarbon polyahis, polyether polyahis, polyester polyahis) disclosed in the parent application prior to reacting with the polyisocyanate. Suitable telechelic polyahis to blend with the sterically hindered polyamines are preferably compatible telechelic polyahis. In such blends, the weight ratio of the sterically hindered polyamines to the compatible telechelic polyahis depends on the miscibility of the two, and may be 10:1 to 1:10.

Non-limiting examples of polyisocyanates (including diisocyanates) for use in the compositions of the present disclosure include those disclosed in the parent applications. In one example, saturated polyisocyanates (including aliphatic and cycloalipahtic polyisocyanates) are preferred for enhanced weatherability. In another example, aromatic polyisocyanates, particularly those that are free of non-aromatic unsaturations, are preferred for forming highly resilient materials (e.g., having a percentage of rebound of 60% or greater). To form thermoplastic materials, diisocyanates and uretdiones of diisocyanates are preferred choices. To form thermoset materials, higher polyisocyanates such as triisocyanates, tetraisocyanates, biurets and isocyanurates of diisocyanates may be preferred. When the reaction rate moderation is desired, it is preferred to use in formulating the composition one or more sterically hindered polyisocyanates, such as those disclosed in the parent application.

The sterically hindered polyamines may be used singly or in blends of two or more thereof when used as curatives to react with isocyanate-containing prepolymers. Preferably, one or more of the sterically hindered polyamines may be blended with one or more polyahis (e.g., polyols, polyamines) disclosed in the parent application prior to reacting with the prepolymer. Non-limiting examples of curatives, especially polyahis, for use in the compositions of the present disclosure include those disclosed in the parent application. Suitable polyahis to blend with the sterically hindered polyamines are preferably compatible polyahis. In such blends, the weight ratio of the sterically hindered polyamines to the compatible polyahis depends on the miscibility of the two, and may be 10:1 or less, preferably 4:1 or less, more preferably 2:1 or less, further preferably 1:1 or less, typically 1:20 or greater, preferably 1:10 or greater, more preferably 1:3 or greater.

The materials formed from the compositions comprising at least the sterically hindered polyamine, the polyisocyanate, and the optional telechelic polyahl or other polyahl may be used to form one or more portions (e.g., thin barrier layers, inner and/or outer cover layers) of the golf ball, utilizing some or all of the enhanced properties such as ease to process and reduced material hardness. In one example, the material has a Shore A hardness of 70 or less. The materials may have 15 weight percent to 50 weight percent of hard segments by weight of the material. The material may have a percentage of rebound of 60% or greater.

A variety of additives can optionally be incorporated into the compositions of the present disclosure, or any one or more of the subcomponents thereof. These additives include, but are not limited to, catalysts to alter the reaction rate, fillers to adjust density and/or modulus, processing aids or oils (such as reactive or non-reactive diluents) to affect rheological and/or mixing properties, reinforcing materials, impact modifiers, wetting agents, viscosity modifiers, release agents, internal and/or external plasticizers, compatibilizing agents, coupling agents, dispersing agents, crosslinking agents, defoaming agents, surfactants, lubricants, softening agents, coloring agents including pigments and dyes, optical brighteners, whitening agents, UV absorbers, hindered amine light stabilizers, blowing agents, foaming agents, and any other modifying agents known or available to one of ordinary skill in the art. One or more of these additives may be used in amounts sufficient to achieve their respective purposes and desired effects. Non-limiting examples of such additives and their appropriate amounts are disclosed in the parent application.

Conventional materials used for golf ball covers, intermediate layers, and cores may be blended with the compositions of the present disclosure, by about 1 weight percent to about 95 weight percent of the composition. Non-limiting examples of such materials are disclosed in the parent applications. Preferably, a thermoplastic composition of the present disclosure is used, optionally in a blend with one or more conventional thermoplastic materials.

The compositions disclosed herein above may be used to form, in whole or in part, one or more portions of the golf ball, such as a cover layer, an intermediate layer, a barrier layer, a coating layer, and the like. The golf ball cover layer or at least one sub-layer thereof (e.g., inner cover layer, outer cover layer) may preferably be formed from one of the compositions disclosed herein. The cover layer can have a thickness from 0.001 inches to 0.125 inches, preferably from 0.005 inches to 0.1 inches, more preferably from 0.01 inches to 0.05 inches, most preferably from 0.015 inches to 0.04 inches, like 0.035 inches. Alternatively, the thickness of the cover layer is 0.5 inches or less, preferably 0.05 inches to 0.2 inches, more preferably 0.05 inches to 0.1 inches. The cover layer may have a flexural modulus of 1,000 to 100,000 psi, preferably 1,000 psi to 80,000 psi, more preferably 1,000 to 50,000 psi, even preferably 1,000 psi to 30,000 psi, most preferably 2,000 psi to 25,000 psi, alternatively 10,000 psi to 80,000 psi. The Shore D hardness of the cover layer may be 90 or less, preferably 20 to 70, more preferably 20 to 60, further preferably from 25 to 55, even preferably from 30 to 55, most preferably from 40 to 55. The cover layer may preferably have a WVTR of about 2 g/(m$^2$×day) or less, The core of the golf ball may be solid, fluid-filled, gel-filled, or gas-filled, having a single-piece construction or a multi-piece construction that includes a center and one or more outer core layers. Non-limiting examples of materials and compositions suitable for forming the core or one or more layers of the core are disclosed in the parent applications. Preferred compositions for solid cores include a base rubber (e.g., polybutadiene rubbers having a 1,4-cis content of at least about 40%), a crosslinking agent (e.g., ethylenically unsaturated acids having 3 to 8 carbon atoms and metal salts thereof), an initiator (e.g., peroxides, carbon-carbon initiators, and blends of two or more thereof) and, optionally, one or more additives (e.g., CoR enhancer like halogenated organosulfur compounds).

The golf ball core may have a diameter of 0.5 inches or greater, preferably 1 inch or greater, more preferably 1.5 inches or greater, further preferably 1.54 inches or greater, even preferably 1.545 inches or greater, most preferably 1.55 inches or greater, typically about 1.65 or less, or about 1.6 inches or less. The core may have an Atti compression of 20 to 120, preferably 30 to 100, more preferably 40 to 90, further preferably 45 to 85, further preferably 50 to 80, further preferably 50 to 75, even more preferably 50 to 65, most preferably 55 to 60; alternatively, the compression may be 25 or less, or 20 or less. The core may have a CoR of 0.7 or greater, preferably 0.75 or greater, more preferably 0.77 or greater, further preferably 0.79 or greater, even more preferably 0.8 or greater, and most preferably 0.81 or greater. The core may comprise a center and one or more outer core layers. The outer core layer may have a thickness of 0.5 inches or less, preferably 0.3 inches or less, more preferably 0.25 inches to 0.3 inches.

One, two, or more optional intermediate layers may be disposed between the core and the cover. The intermediate layer may be part of the core as an outer core layer, or part of the cover as an inner cover layer. In one example, an intermediate layer can be formed from a hard, high flexural modulus, resilient material which contributes to the low spin, distance characteristics when they are struck for long shots (e.g. driver or long irons). The material of the intermediate layer can have a Shore D hardness of 65-80, preferably 69-74, more preferably 70-72. The flexural modulus of the intermediate layer can be at least 65,000 psi, preferably from 70,000 psi to 120,000 psi, more preferably from 75,000 psi to 100,000 psi. The thickness of the inner cover layer may be from 0.020 inches to 0.045 inches, preferably from 0.030 inches to 0.040 inches. The intermediate layer preferably has a WVTR lower than that of the cover. More preferably, the WVTR of the intermediate layer is no greater than that of an ionomer resin such as Surlyn®, which is in the range of about 0.45 g/(m²× day) to about 0.95 g/(m²×day). Non-limiting examples of suitable materials and compositions that form the intermediate layers are disclosed in the parent application.

The resultant golf balls typically have a CoR of about 0.7 or greater, preferably about 0.75 or greater, more preferably about 0.78 or greater, most preferably about 0.8 or greater. The golf balls also typically have an Atti compression of at least about 40, preferably from about 50 to 120, and more preferably from about 60 to 100. The golf balls typically have dimple coverage greater than about 60 percent, preferably greater than about 65 percent, and more preferably greater than about 75 percent. The diameter of the golf ball is preferably from 1.680 inches to 1.800 inches, more preferably from 1.680 inches to 1.760 inches, most preferably from 1.680 inches to 1.740 inches.

Golf balls of the present invention may have a variety of constructions, typically comprising at least a core and a cover. Optionally, one or more intermediate layers may be disposed between the core and the cover; the core may be a single solid mass, or include a solid, liquid-filled, gel-filled or gas-filled center and one or more outer core layers; and the cover may include an outer cover layer and one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The compositions for golf ball portions as disclosed herein may be used in sporting equipment in general. Specifically, the compositions may be applied in various game balls, golf club shafts, golf club head inserts, golf shoe components, and the like.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising:

a core, the core having a diameter; and at least one layer disposed about the core, the layer having a thickness, wherein the layer is formed from a polyurea composition, wherein the polyurea is formed by reacting a polyurea prepolymer with an amine curative, and wherein the polyurea prepolymer is formed by reacting a polyisocyanate with a sterically hindered polyamine having one of the following structures:

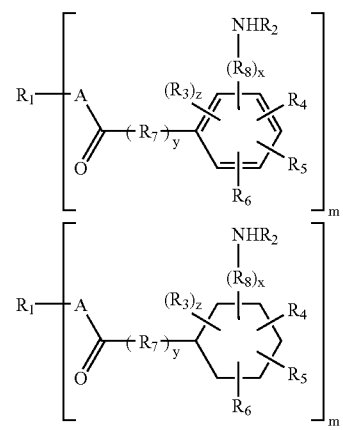

where —$(R_8)_x$NHR$_2$ and —$(R_7)_y$CO— are ortho- or meta-substituents on the cyclic rings; A is the same or different moieties chosen from O, S, and NR; R is hydrogen or organic moieties having 1 to 20 carbon atoms; $R_1$ is a divalent or polyvalent organic moieties having at least one carbon or silicon atom; $R_2$ is hydrogen or organic moieties having 1 to 20 carbon atoms; $R_3$ to $R_6$ are independently chosen from hydrogen, halides, nitro, and organic moieties having 1 to 20 carbon atoms; $R_7$ is an organic moiety having at least one C, O, N, S, or Si atom; $R_8$ is a divalent organic moiety having one carbon atom connecting —$NHR_2$ to the cyclic ring; m is greater than 1; and x, y, and z are independently 0 or 1.

2. The golf ball of claim 1, wherein the diameter is 1 inch or greater, and the thickness is 0.005 inches to 0.1 inches.

3. The golf ball of claim 1, wherein the core is a solid core having a compression of 40 to 100 or a coefficient of restitution of 0.7 or greater, and the layer has a flexural modulus of 1,000 psi to 100,000 psi or a Shore D hardness of 90 or less.

4. The golf ball of claim 1, wherein the golf ball has a coefficient of restitution of 0.7 or greater.

5. The golf ball of claim 1, wherein A is O.

6. The golf ball of claim 1, wherein at least one of x and y is 0.

7. The golf ball of claim 1, wherein $R_1$ has one or more heteroatoms.

8. The golf ball of claim 1, wherein $R_1$ is a divalent alkylene.

9. The golf ball of claim 1, wherein the golf ball further comprises:
an intermediate layer disposed between the at least one layer and the core; or
an outer cover layer disposed about the at least one layer.

10. A golf ball comprising:
a core, the core having a diameter; and
at least one layer disposed about the core, the layer having a thickness, wherein the layer is formed from a polyurea composition, wherein the polyurea is formed by reacting a polyurea prepolymer with an amine curative, and wherein the polyurea prepolymer is formed by reacting a polyisocyanate with a sterically hindered polyamine formed from:
a first compound being an active hydrogen functional compound, and
a second compound chosen from cyclic compounds having ortho- or meta- positioned (organo)amine and (organo)acid substitutions, esters thereof, and substituted or unsubstituted oxazine diones.

11. The golf ball of claim 10, wherein the active hydrogen functional compound is chosen from alkanediols, alkanetriols, polyalkanediols, dihydroxy telechelics, and trihydroxy telechelics.

12. The golf ball of claim 10, wherein the active hydrogen functional compound is chosen from ethylene glycol, 1-phenyl-1,2-ethanediol, 1,2-propanediol, 1,3-propanediol, 2-methyl-1,3-propanediol, 1,3-butanediol, 1,4-butanediol, 2,3-butanediol, 2-methyl-1,4-butanediol, 1,1,4,4-tetraphenyl-1,4-butanediol, 2,2,4,4-tetramethyl-1,3-cyclobutanediol, 1,5-pentanediol, 2,4-pentanediol, 2-methyl-2,4-pentanediol, 1,6-hexanediol, 2,5-hexanediol, 1,7-heptanediol, 1,8-octanediol, 1,12-dodecanediol, 2-n-butyl-2-ethyl-1,3-propanediol, 3-chloro-1,2-proanediol, 1,4-cyclohexanediol, 2,5-dimethyl-2,5-hexanediol, 2,2-dimethyl-1,3-propanediol, 2,2-diphenyl-1,3-propanediol, 2-ethyl-1,3-hexanediol, 2-ethyl-2-methyl-1,3-propanediol, hydroquinone di(β-hydroxyethyl)ether, hydroquinone di(β-hydroxypropyl)ether, resorcinol di(β-hydroxyethyl)ether, resorcinol di(β-hydroxypropyl)ether, 2,2-bis(4-hydroxyphenol)propane.

13. The golf ball of claim 10, wherein the second compound has one of the following structures:

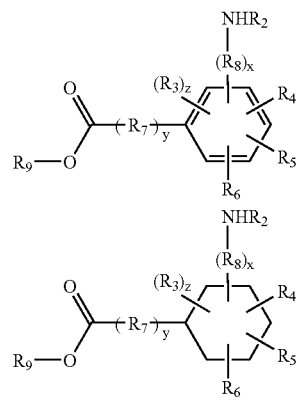

where —$(R_8)_x NHR_2$ and —$(R_7)_y CO$— are ortho- or meta- substituents on the cyclic rings; $R_2$ is hydrogen or organic moieties having 1 to 20 carbon atoms; $R_3$ to $R_6$ are independently chosen from hydrogen, halides, nitro, and organic moieties having 1 to 20 carbon atoms; $R_7$ is an organic moiety having at least one C, O, N, S, or Si atom; $R_8$ is a divalent organic moiety having one carbon atom connecting —$NHR_2$ to the cyclic ring; $R_9$ is chosen from hydrogen and organic moieties having 1 to 20 carbon atoms, optionally further having one or more heteroatoms; and x, y, and z are independently 0 or 1.

14. The golf ball of claim 10, wherein the second compound has one of the following structures:

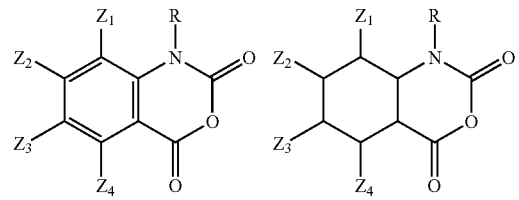

where R is chosen from hydrogen and organic moieties having 1 to 20 carbon atoms; $Z_1$ to $Z_4$ are independently chosen from hydrogen, halides, nitro groups, and organic moieties having 1 to 20 carbon atoms, each optionally having one or more heteroatoms.

15. The golf ball of claim 10, wherein the diameter is 1 inch or greater, and the thickness is 0.005 inches to 0.1 inches.

16. The golf ball of claim 10, wherein the core is a solid core having a compression of 40 to 100 or a coefficient of restitution of 0.7 or greater, and the layer has a flexural modulus of 1,000 psi to 100,000 psi or a Shore D hardness of 90 or less.

17. The golf ball of claim 10, wherein the golf ball has a coefficient of restitution of 0.7 or greater.

18. The golf ball of claim 10, wherein the golf ball further comprises:
an intermediate layer disposed between the at least one layer and the core; or
an outer cover layer disposed about the at least one layer.

* * * * *